United States Patent
Crue, Jr. et al.

(10) Patent No.: US 6,496,330 B1
(45) Date of Patent: Dec. 17, 2002

(54) MAGNETIC WRITE HEAD HAVING A SPLITCOIL STRUCTURE

(75) Inventors: Billy W. Crue, Jr., Pittsburgh, PA (US); Zhupei Shi, San Jose, CA (US); Mark David Thomas, Hollister, CA (US); Lien-Chang Wang, Fremont, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/393,056

(22) Filed: Sep. 9, 1999

(51) Int. Cl.$^7$ .............................. G11B 5/17; H04R 31/00
(52) U.S. Cl. ..................................... 360/123; 29/603.24
(58) Field of Search .............................. 360/123, 125, 360/126; 29/603.24

(56) References Cited

U.S. PATENT DOCUMENTS

| | | | |
|---|---|---|---|
| RE29,326 E | * 7/1977 | Lazzari et al. | 360/123 |
| 4,044,394 A | * 8/1977 | Hanazono et al. | 360/123 |
| 4,315,291 A | * 2/1982 | Lazzari | 360/113 |
| 4,323,941 A | * 4/1982 | Lazzari et al. | 360/123 |
| 4,416,056 A | * 11/1983 | Takahashi | 29/603.24 |
| 4,636,899 A | 1/1987 | Yamada | |
| 4,684,438 A | 8/1987 | Lazzari | |
| 4,694,368 A | 9/1987 | Bischoff et al. | |
| 4,713,711 A | 12/1987 | Jones, Jr. et al. | |
| 4,841,402 A | 6/1989 | Imanaka et al. | |
| 4,884,157 A | * 11/1989 | Roberts et al. | 360/125 |
| 5,022,141 A | * 6/1991 | Nagata et al. | 29/603.24 |
| 5,059,278 A | 10/1991 | Cohen et al. | |
| 5,065,270 A | 11/1991 | Koyanagi et al. | |
| 5,072,324 A | 12/1991 | Lin et al. | |
| 5,113,300 A | 5/1992 | Ikeda et al. | |
| 5,124,870 A | 6/1992 | Toyoda | |
| 5,170,302 A | * 12/1992 | Matsumoto | 360/123 |
| 5,170,303 A | 12/1992 | Mowry et al. | |
| 5,331,495 A | 7/1994 | Yoshida | |
| 5,461,528 A | 10/1995 | Keel et al. | |
| 5,465,475 A | * 11/1995 | Kinoshita et al. | 29/603.16 |
| RE35,228 E | * 5/1996 | Mowry et al. | 360/126 |
| 5,570,251 A | * 10/1996 | Shinoura et al. | 360/125 |
| 5,673,474 A | 10/1997 | Watterston | |
| 5,699,605 A | 12/1997 | Amin et al. | |
| 5,706,152 A | 1/1998 | Honjo et al. | |
| 5,734,534 A | 3/1998 | Yamamoto et al. | |
| 5,796,564 A | 8/1998 | Shouji et al. | |
| 5,831,800 A | 11/1998 | Lin et al. | |
| 5,875,080 A | 2/1999 | Seagle | |

FOREIGN PATENT DOCUMENTS

| | | | | |
|---|---|---|---|---|
| EP | 0 147 003 A1 | * 7/1985 | | |
| JP | 56-44119 | * 4/1981 | | |
| JP | 58-128012 | * 7/1983 | | |
| JP | 62-107418 | * 5/1987 | | |
| JP | 62145703 A | * 6/1987 | | H01F/5/00 |
| JP | 1-220114 | * 9/1989 | | |

* cited by examiner

*Primary Examiner*—William Klimowicz
(74) *Attorney, Agent, or Firm*—Carr & Ferrell LLP

(57) ABSTRACT

A magnetoresistive head having a split coil structure including multiple, similar coil layers separated by an insulator and joined at their ends to define parallel electrical paths. The coil passes through a magnetic yoke having an open end and a closed end and is electrically insulated from the yoke. The parallel electrical paths of the separate coil layers can each be modeled as a resistor in series with an inductor, each of the paths also being in parallel with a capacitor. The split coil has a much faster current rise time than a comparable single layer coil or than multiple coils connected in series. Since the coil current provides the magneto-motive force for imparting a signal on a passing recording medium, the decreased current rise time corresponds to an increased data recording rate.

28 Claims, 23 Drawing Sheets

MAGNETIC WRITE HEAD HAVING A SPLITCOIL STRUCTURE

BACKGROUND OF THE INVENTION

This invention relates generally to magnetic disk data storage systems, and more particularly to magnetic write transducers and methods of making same.

Magnetic disk drives are used to store and retrieve data for digital electronic apparatuses such as computers. In FIGS. 1A and 1B, a magnetic disk data storage system 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as its is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor, which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a backgap portion 40, with these three elements collectively forming a yoke 41. The combination of a first pole tip portion 43 and a second pole tip portion 45 near the ABS are sometimes referred to as the yoke tip portion 46. A write gap 36 is formed between the first and second poles 32 and 38 in the yoke tip portion 46. The write gap 36 is filled with a non-magnetic, electrically insulating material that forms a write gap material layer 37. This non-magnetic material can be either integral with (as is shown here) or separate from a first insulation layer 47 that lies below the second pole 38 and extends from the yoke tip portion 46 to the backgap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A. As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the winds 49 from each other and from the second pole 38.

The configuration of the conductive coil 48 can be better understood with reference to a plan view of the read/write head 24 shown in FIG. 2B taken along line 2B—2B of FIG. 2A. Because the conductive coil extends beyond the first and second poles, insulation may be needed beneath, as well as above, the conductive coil to electrically insulate the conductive coil from other structures. For example, as shown in FIG. 2C, a view taken along line 2C—2C of FIG. 2A, a buildup insulation layer 52 can be formed adjacent the first pole, and under the conductive coil layer 48. As will be appreciated by those skilled in the art, these elements operate to magnetically write data on a magnetic medium such as a magnetic disk 16 (see FIGS. 1A and 1B). With reference to FIG. 3, the coil defines an electrical circuit which can be modeled as a head resistance Rh in series with a head inductance Lh, both of which are in parallel with a head capacitance Ch.

More specifically, an inductive write head such as that shown in FIGS. 2A–2C operates by passing a writing current through the conductive coil layer 48. Because of the magnetic properties of the yoke 41, a magnetic flux is induced in the first and second poles 32 and 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a trackwidth of the write element, which defines track density. For example, a narrower trackwidth can result in a higher magnetic recording density. The trackwidth is defined by the geometries in the yoke tip portion 46 (see FIG. 2A) at the ABS. These geometries can be better understood with reference to FIG. 2C. As can be seen from this view, the first and second poles 32 and 38 can have different widths W1 and W2 respectively in the yoke tip portion 46 (see FIG. 2A). In the shown configuration, the trackwidth of the write element 28 is defined by the width W2 of the second pole 38. Thus, accurate definition of the trackwidth is critical during the fabrication of the write element.

However, the control of trackwidth, and coil pitch can be limited by typical fabrication processes, an example of which is shown in the process diagram of FIG. 4A. The method 54 includes an operation 56 of providing a first pole. This operation can include, for example, forming a plating dam, plating and then removing the dam. In an operation 58, a write gap material layer is formed over the first pole. In particular, the write gap material layer is formed over an upper surface of the first pole. Also, in operation 58, a via is formed through the write gap material layer to the first pole in the backgap portion 40 (see FIG. 2A). In the instance herein described, the write gap material layer extends above the first pole in the area between the yoke tip portion and the backgap portion, although in other cases the write gap material layer may not be above this area. A buildup insulation layer is typically formed by depositing (e.g., spinning) and patterning photoresistive material and then hard baking the remaining photoresistive material. Such processes often result in the height of the buildup insulation layer being non-uniform.

In an operation 62 the first coil layer is formed above the write gap material layer and the buildup insulation layer.

This can include first depositing a seed layer above the first pole. Typically, photoresistive material can then be deposited and patterned. With the patterned photoresistive material, conductive material can be plated. With removal of the photoresistive material, the remaining conductive material thereby forms the first coil layer.

Unfortunately, when there is a difference in height between the write gap material layer and the buildup insulation layer, the patterning of the photoresistive material for the first coil layer can be complicated. In particular, it can be difficult to pattern the various heights to have consistent geometries. More specifically, winds of the resulting first coil layer can be wider at lower levels than at higher levels, such as between the first and second poles. Thus, for a given pitch, such greater width at the lower levels can result in smaller distances between winds. This can, in turn, result in electrical conduction between winds which can be detrimental to write performance. To avoid such electrical shorting, the minimum wind pitch can be set to a desired value that will result in adequate yield of non-shorting conductive coil layers. Because the coil winds are more narrow between the first and second poles, the resulting pitch there is typically greater than, and limited by this minimum. For example, typical wind pitches between the first and second poles may be limited to no less than about 3 microns. For a given number of winds and wind thickness, this in turn limits the minimum yoke length, and thereby limits the data transfer rate and data density as described above. For example, a pitch of about 3 microns maybe adequate for recording densities on the order of about 2 Gb/sq.in., however, these typical pitches can be inadequate for larger recording densities, such as about 10 Gb/sq.in.

In operation 64, the method 54 further includes forming a coil insulation layer above the first coil layer that was formed in operation 62. In an operation 66 a second pole is formed above the coil insulation layer of operation 64.

Still another parameter of the write element performance is the stack height SH, the distance between the top surface of the first pole 32 and the top of the second pole 38, as shown in FIG. 2A. Of course this height is affected by the thickness of the first insulation layer 47, the thickness of the coil layer 48 and any other coil layers that might be included, and the height of the coil insulation layer 50 and any other coil insulation layers that might be included. The stack height can be an indicator of the apex angle $\alpha$, which partially characterizes the topology over which the second pole must be formed near the yoke tip portion. Typically, the reliability of the write element decreases as the apex angle increases. This is due, at least in part, to the corresponding increased difficulty, particularly in the yoke tip portion 46, of forming the second pole 38 over the higher topography of the stack. For example, the definition of the second pole width W2, shown in FIG. 2C, including photoresist deposition and etching, can be decreasingly reliable and precise with increasing topography. When demand for higher density writing capabilities drives yoke tip portions to have smaller widths W, this aspect of fabrication becomes increasingly problematic.

Also, with higher topography, when the second pole is formed, for example by sputtering or plating, the material properties of the second pole in the sloped region, adjacent the second pole tip region 45, can be undesirable. Thus, this decreased reliability results in undesirable lower production yield. A device with a lower apex angle is, therefore, desirable.

Magnetic recording density is equal to track density times linear density. Increasing linear density results in high data transfer rate. One may expect 1000 megabits per second will be required in year 2000. To support higher data rate applications, the second pole can otherwise be formed by lamination, which can be more time consuming than without lamination. In order to obtain faster recording speeds, and therefore higher data transfer rates, it may be desirable to have a shorter yoke length YL because this can shorten the flux rise time. The relationship can be seen in the graph of yoke length YL versus flux rise time shown in FIG. 4B. This relationship can be more fully understood with reference to "Ultrafast Laser Diagnostics and Modeling for High-speed Recording Heads", IEEE Transactions on Magnetics, Vol. 35 No. 2, 623 (1999) by Zhupei Shi, W. K. Hiebert and M. R. Freeman, the entirety of which is hereby incorporated by reference.

Another important parameter in the write element is the number of winds 49 in the coil layer 48, which determines the magnetic motive force (MMF) of a write element. With increasing number of winds 49 between the first and second poles 32, 38, the fringing field is stronger and, thus, the write performance increases. However, the number of winds is limited by the yoke length YL, shown in FIG. 2A, and the wind pitch P between adjacent winds 49.

As will be appreciated from the above, the design of a write element having the ability to provide increased data rate capabilities is limited by many factors. For example it is desirable to minimize yoke length as well as stack height. However, a write head must also provide sufficient magneto-motive force, which is limited by current flow and the number of winds in the yoke. The number of winds can not be increased without increasing yoke length or stack height and the amount of current is limited by the amount of heat generation which can be tolerated within the head, as heat generation can effect the read characteristics of the head by causing thermal stresses which will be interpreted by the read sensor as magnetic signals.

Therefore, there remains a need for a fundamentally different approach to increase data rate capability in a write element in light of the other aforementioned design parameters and manufacturing limitations. The desired head would be capable of increasing data recording rate while recording with sufficient magneto-motive force data density on a passing magnetic disk and. Preferably, such a write element would have a low stack height and short yoke length as well as a small track width. Such a write element should also lend itself to cost effective manufacturing techniques.

SUMMARY OF THE INVENTION

The present invention provides a magnetic write element providing increased data rate recording performance while maintaining sufficient magneto-motive force and data density. The write element includes a magnetic yoke having an open end and a closed end and an open interior there between. A split coil is also provided, which has a portion of its winds passing through the open interior of the yoke. The split coil is electrically insulated from the yoke. The coil is split so that it defines first and second coil layers separated by a thin dielectric coil separation layer. The first and second coil layers are joined at their inner and outer ends to define parallel electrical circuits.

More particularly, the present invention is embodied in a combination read/write head having a read element and a write element, both of which are built upon a ceramic substrate. The read element includes a first shield disposed upon the substrate and a second shield disposed above the first shield. A first layer of dielectric material, sandwiched between the first and second shields contains a read sensor for detecting a magnetic signal from a recording medium passing thereby. The first layer of dielectric material extends beyond the edges of the shields filling the space from the substrate to the upper surface of the second shield.

The write element includes a first pole and a second pole joined together to form the magnetic yoke. The second shield provides a portion of the first pole of the write element. The first pole also includes a pedestal at the write gap, the open end of the yoke. The second shield is constructed of a magnetic material such as $Ni_{80}Fe_{20}$, and the pedestals can either be constructed of the same material at the shield or can be constructed of a material having a higher saturation moment.

A layer of dielectric material covers the first shield having an upper surface which is flush with the upper surfaces of the pedestals. The split coil is formed on top of this second dielectric layer and has contact pads at its inner and outer ends. The split coil can preferably be constructed of copper and its first and second coil layers are essentially identical and located one over the other. The first and second coil layers are separated by a very thin insulating layer which is preferably constructed of $Al_2O_3$. The first and second coil layer each share in common the inner and outer contact pads, thereby forming a parallel electrical circuit to which voltage can be applied at the contact pads.

A coil insulation layer covers the coil and is formed so that it does not cover either of the pedestals or the contact pads. A thin layer of non-magnetic, electrically insulating write gap material covers the coil insulation layer and also covers the pedestal at the open end of the yoke. The write gap material does not cover the back gap area or the coil contact pads. The second pole sits atop the write gap material above the first pole and contacts the first pole in the back gap area at the closed end to complete the yoke. The second pole is constructed of a magnetic material with a high magnetization such as $Ni_{45}Fe_{55}$.

The first and second coil layers define a parallel electrical circuit which can be modeled as two electrical paths each having a resistor in series with an inductor, both parallel paths being in parallel with a capacitor. The two inductive paths have the advantageous property of an increased current rise time as compared with a single inductive path, while still maintaining the same magneto-motive force. Furthermore, a split coil can achieve this while having essentially the same height as a single coil. In this way the write element of the present invention provides greatly increased data rate while maintaining other critical design parameters.

Other embodiments are also possible. For example, the write gap material could be disposed between the coil and the first pole or between the coil and the coil insulation layer. Also, the first pole could be constructed without any pedestals. In another embodiment, the split coil could be constructed with three or more coil layers, depending upon design requirements.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 5:
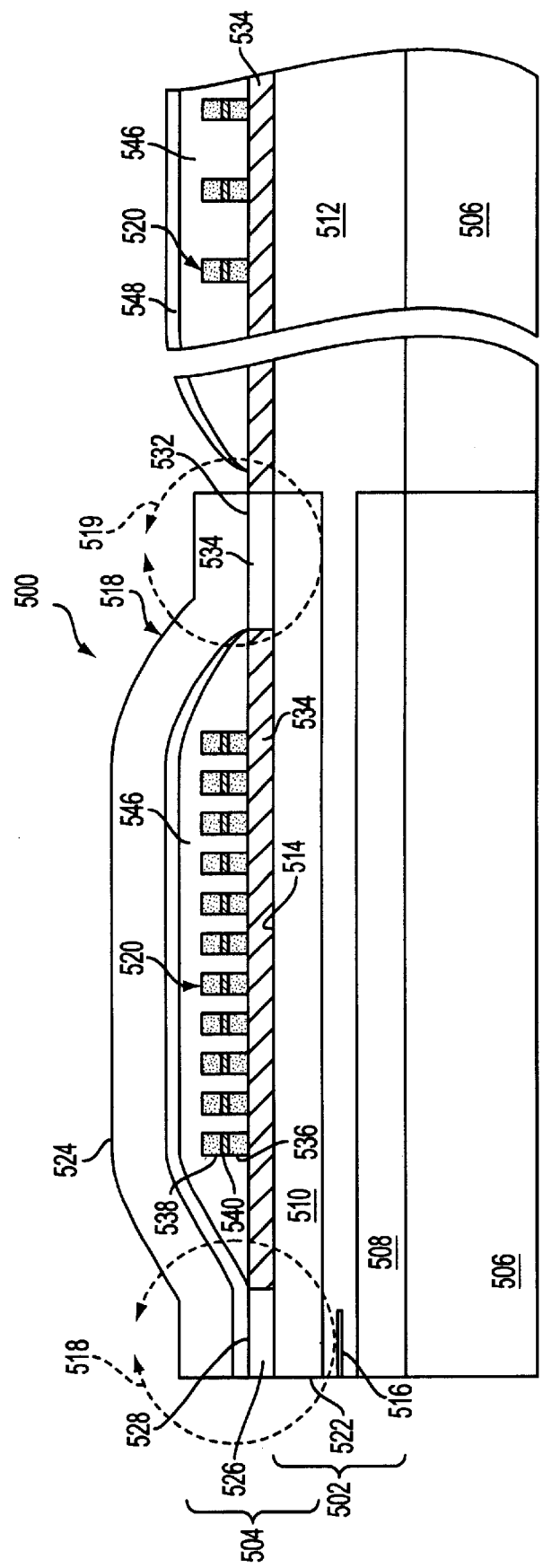
FIG. 5 is a cross sectional view of a read/write head of the present invention.

With reference to FIG. 5, the present invention is embodied in a magnetoresistive head 500 including a read portion 502 and a write portion 504 all of which is built upon a substrate 506. The read portion includes first and second shields 508 and 510, separated by a first dielectric layer 512. The first dielectric layer 512 extends beyond the edges of the shields 508 and 510, extending to a level flush with an upper surface 514 of the second shield 510. A read sensor 516 is embedded within the dielectric layer for sensing a magnetic signal from a recording medium passing thereby.

With continued reference to FIG. 5, the write element 504 also includes a magnetic yoke 518 having an open interior through which passes an electrically conductive split coil 520 which is electrically insulated from the yoke 518. The write element 504 has a write gap portion 517 at one end and aback gap portion 519 at its opposite end.

More particularly, the yoke 518 includes a first magnetic pole 522 and a second magnetic pole 524 formed thereover. The second shield 510 of the read element serves as a portion of the first pole 522 of the yoke 518. The first pole 522 also includes a write gap pedestal 526 which extends upward from the upper surface 514 of the shield 510 in the write gap portion of the write element 504. The write gap pedestal 526 has a smooth flat upper surface 528. Opposite the write gap pedestal, the first pole further includes a back gap pedestal 530 also extending from the upper surface 514 of the shield 510. The back gap pedestal has a smooth, flat upper surface 532 which is coplanar with the upper surface 528 of the write gap pedestal. In the preferred embodiment, the shield 510 as well as the pedestals 526 and 530 are constructed of $Ni_{80}Fe_{20}$. Alternatively, one or both of the pedestals 526 and 530 are constructed of a high saturation moment material such as $Ni_{45}Fe_{55}$.

With continued reference to FIG. 5, a second dielectric layer 534 covers the second shield 510 and extends beyond the edges thereof. The second dielectric layer has a smooth flat upper surface which is flush with the upper surfaces 528 and 532 of the pedestals 526 and 530. While the second dielectric layer 534 can be constructed of any suitable electrically insulating material, it is preferably constructed of $Al_2O_3$.

Figure 6:
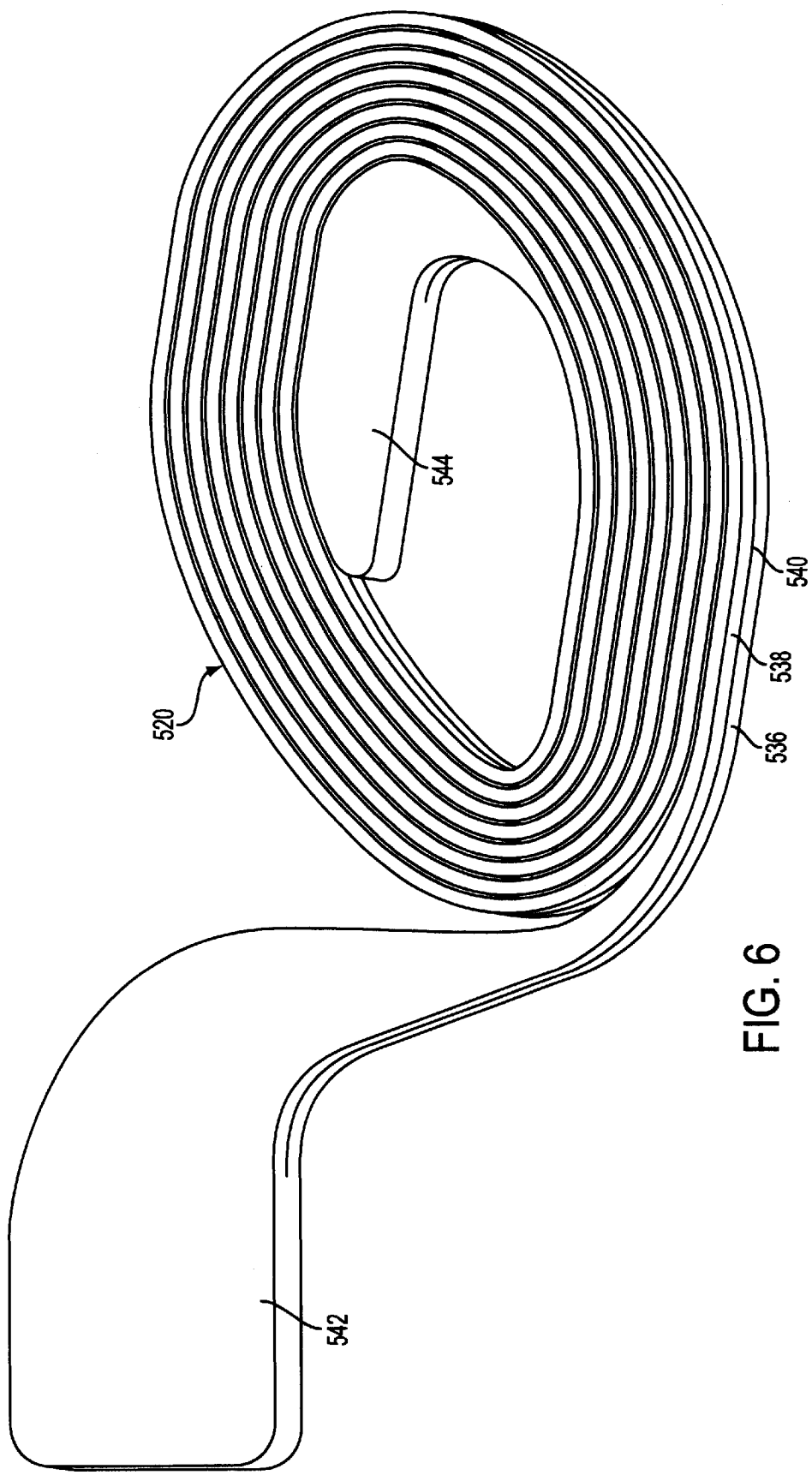
FIG. 6 is a perspective view of a split coil of the present invention.

The split coil 520 sits atop the dielectric layer 534, and is formed so that a portion of the coil passes over the first pole 522 between the write gap portion 517 and the back gap portion 519. As can be more clearly understood with reference to FIG. 6 in conjunction with FIG. 5, the split coil 520 consists of a first coil layer 536 and a similar second coil layer 538 formed above the first coil layer 536 and separated therefrom by an electrically insulating coil separation layer 540. The first and second coil layers 536 and 538 are joined by common coil contacts pads 542 and 544 formed at the inner and outer ends of the split coil 520 respectively. In this way, the first and second coil layers 536 and 538 define parallel electrical circuits when a current is supplied at the contacts 542 and 544. Preferably the coil has a pitch of less than 2 microns in order to allow the yoke to have a small yoke length.

While the preferred embodiment has a coil 520 which is split once to include two coil layers 536 and 538, alternate embodiments, not shown, having three or more separated coil layers are also possible. The split coil 20, including the first and second coil layers 536 and 538 as well as the contacts 542 and 544 can be constructed of any suitable non-magnetic metal and is preferably constructed of copper. The coil separation layer, which can be constructed of any suitable dielectric insulating material, is preferably constructed of $Al_2O_3$.

With continued reference to FIG. 5, the split coil 520 is covered with a coil insulation layer 546 which electrically insulates the winds of the coil from one another as well as insulating the coil 520 from surrounding structure. While the coil insulation layer could be constructed of any suitable electrically insulating material it is preferably constructed of a spun, cured photoresist. The coil insulation layer 546 has a smoothly sloping edge adjacent the write gap pedestal 526.

A thin layer of non-magnetic, electrically insulating write gap material 548 covers the coil insulation layer 546 and also covers the upper surface 528 of the write gap pedestal 526. The write gap material is formed so that it does not cover the back gap pedestal 530 or the contacts 542 and 544. While the write gap material could be constructed of many electrically insulating, non-magnetic materials it is preferably constructed of $Al_2O_3$.

With further reference to FIG. 5, the second pole 524 covers the write gap material layer 548 above the first pole 522. The second pole contacts the upper surface 532 of the back gap pedestal 530, thereby joining with the first pole 522 to form the magnetic yoke 518. While the second pole 524 could be constructed of any suitable magnetic material, it is preferably formed of $Ni_{45}Fe_{55}$ and is deposited by plating.

Figure 1A:
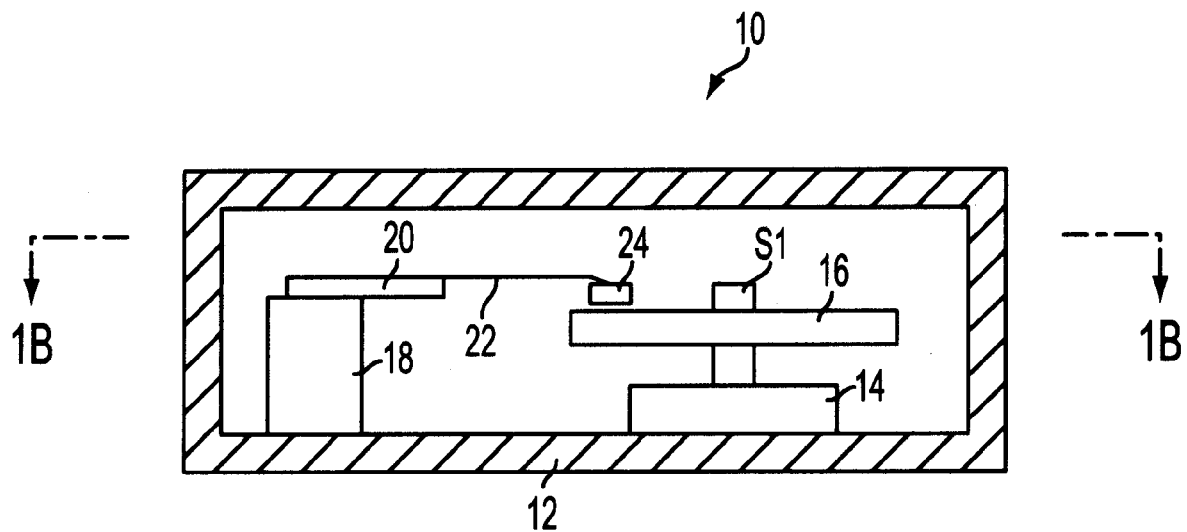
FIG. 1A is a partial cross-sectional front elevation view of a magnetic data storage system.
Figure 1B:
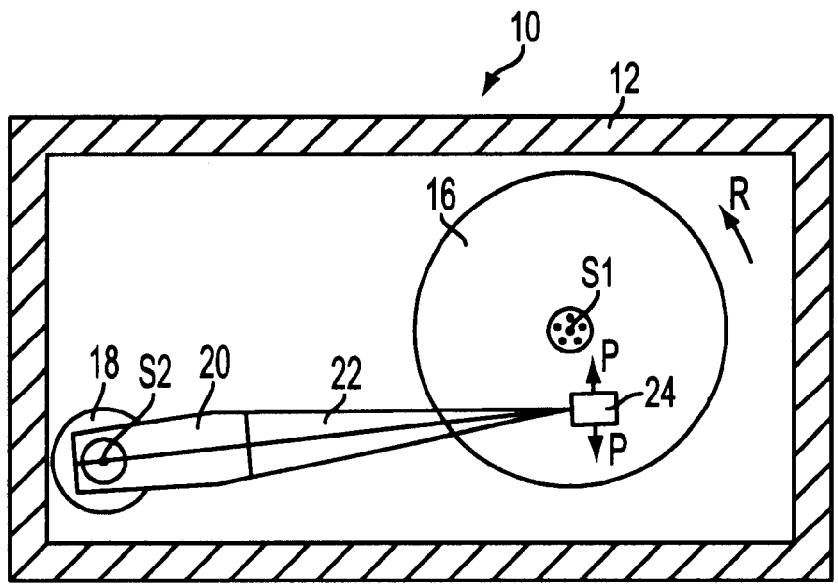
FIG. 1B is a top plan view taken along line 1B—1B of FIG. 1A.
Figure 2A:
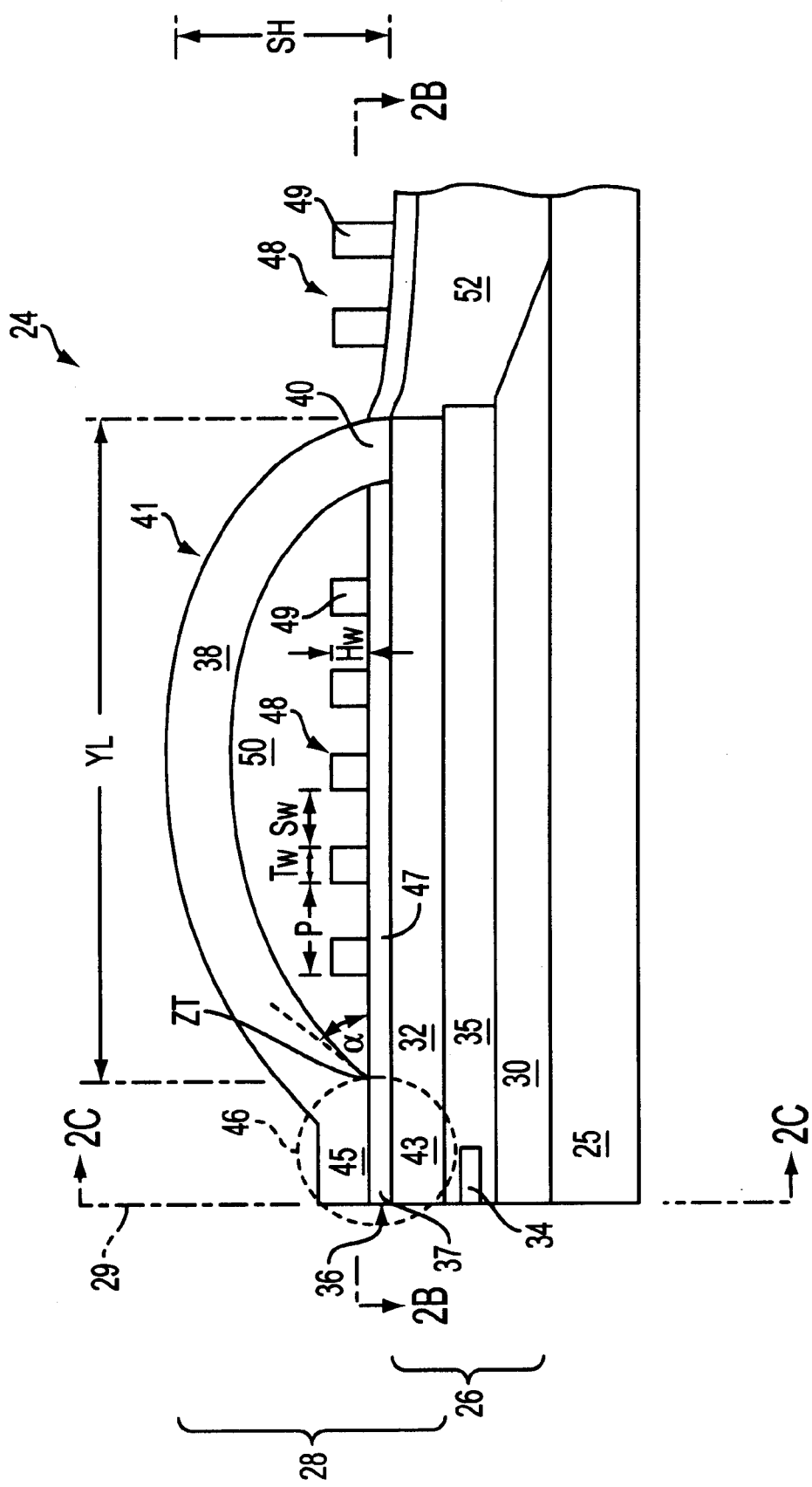
FIG. 2 is a cross-sectional view of a prior art read/write head of the magnetic disk drive assembly of figures 1A and 1B.
FIG. 2B is a plan view taken along line 2B—2B of FIG. 2A.
FIG. 2C is an ABS view taken along line 2C—2C of FIG. 2A.
Figure 2B:
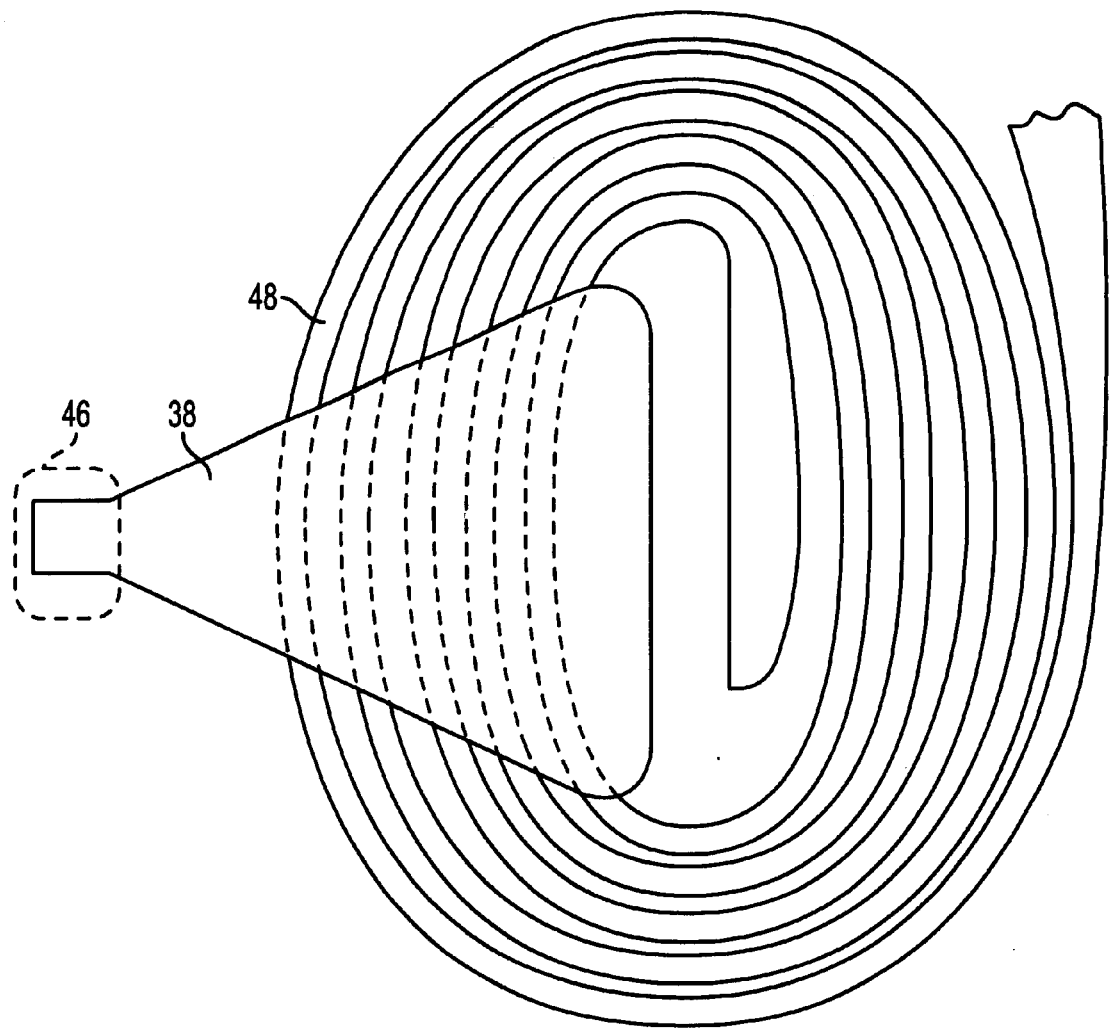
Figure 2C:
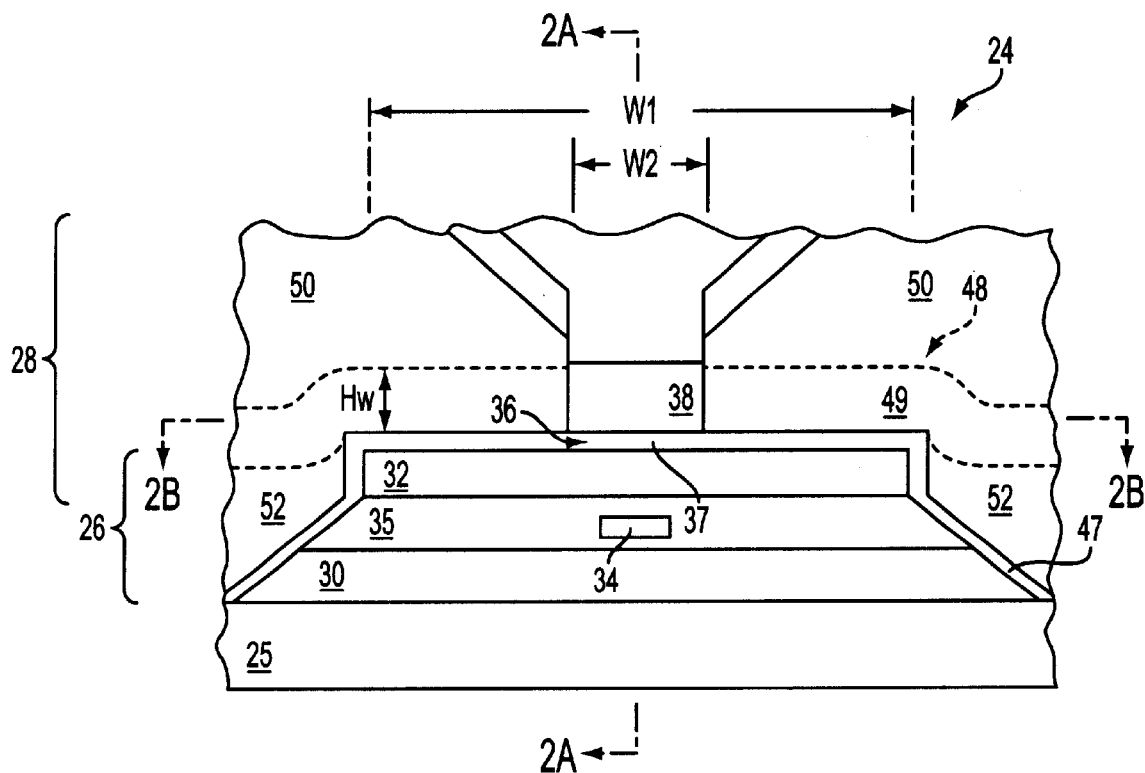
Figure 3:
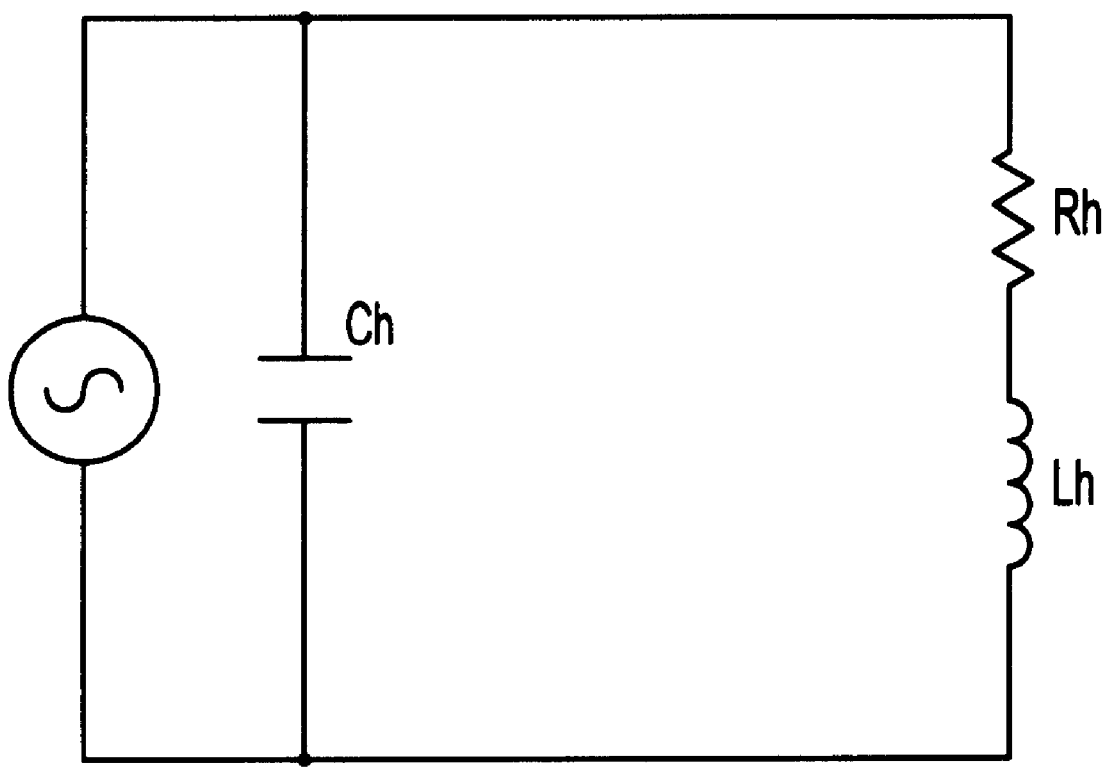
FIG. 3 is a schematic of an electrical circuit defined by a write element of the prior art.
Figure 4A:
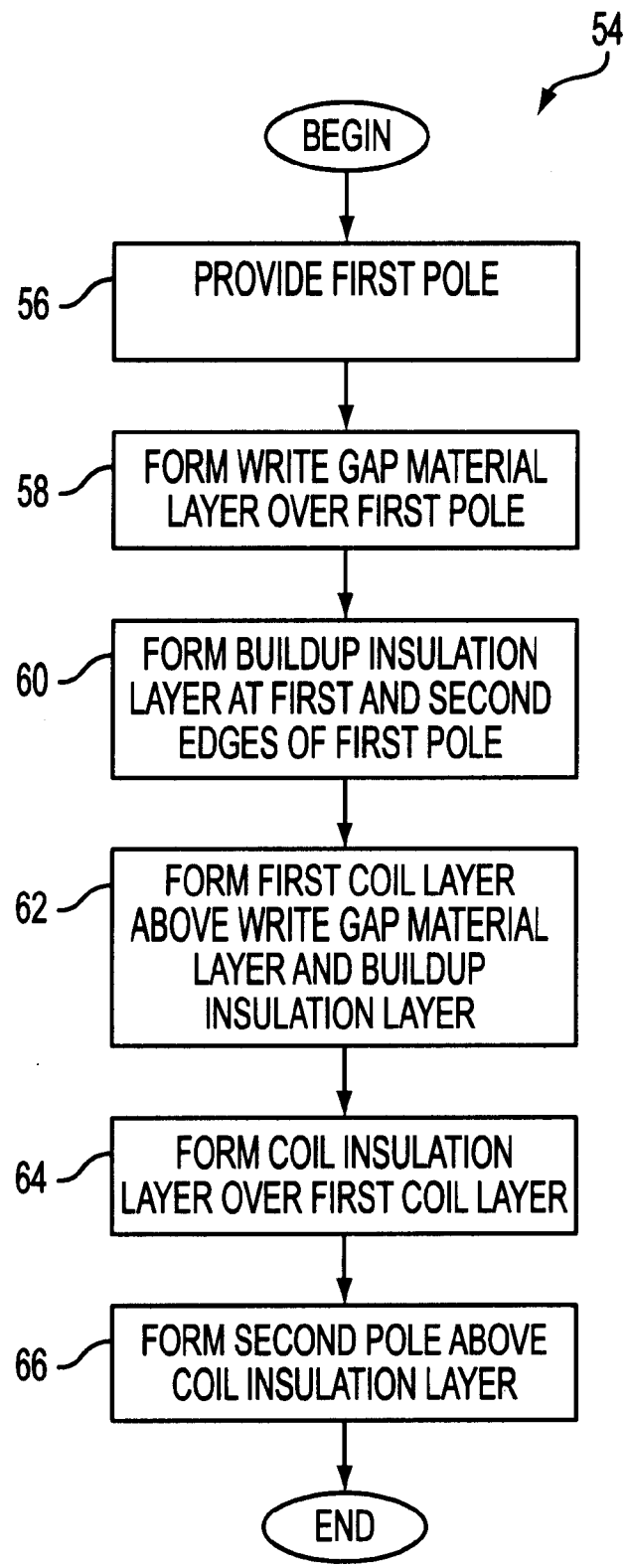
FIG. 4A is a process diagram of a method for forming a write element of the prior art.
Figure 4B:
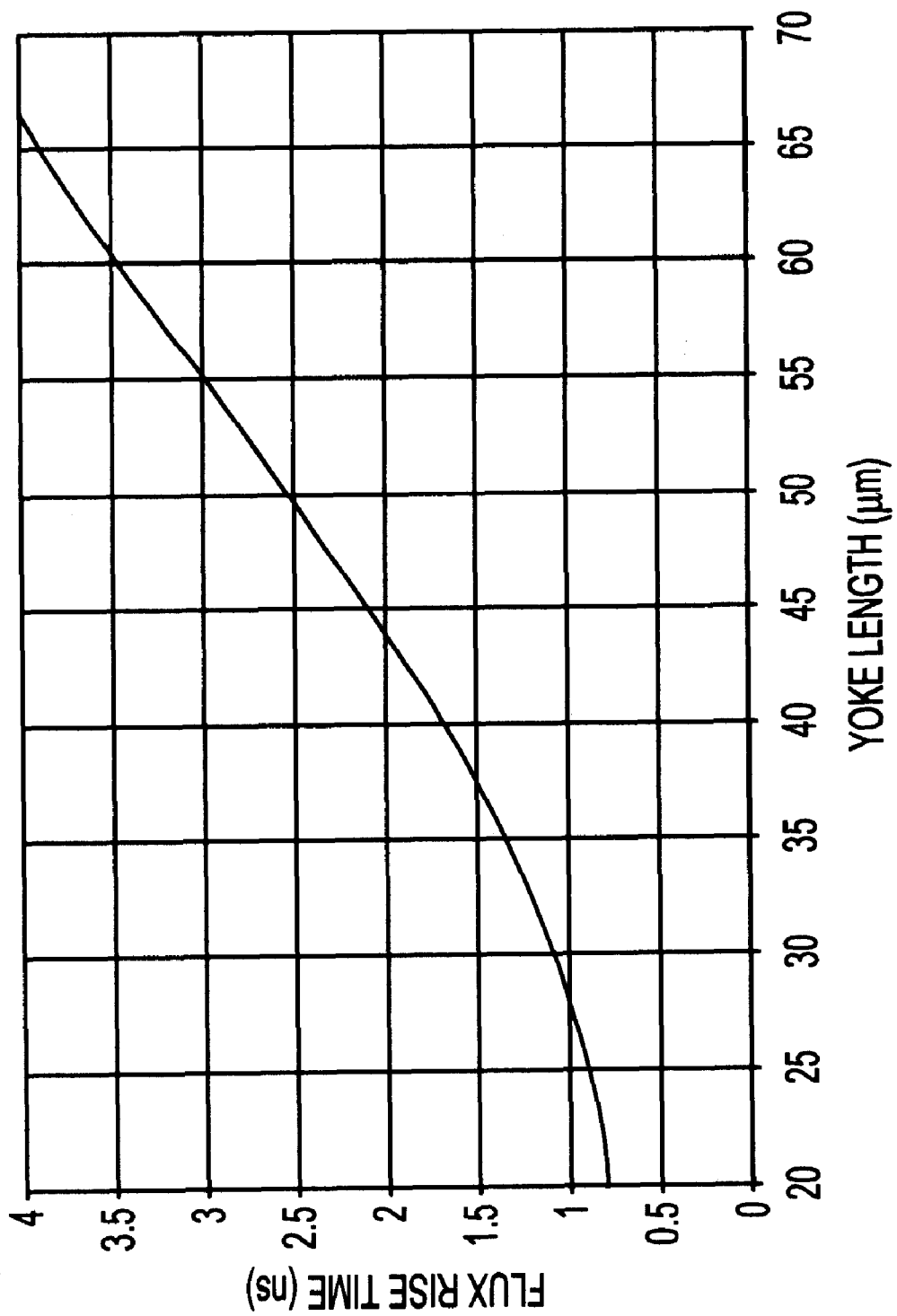
FIG. 4B is a graph of yoke length YL versus flux rise time.
Figure 7:
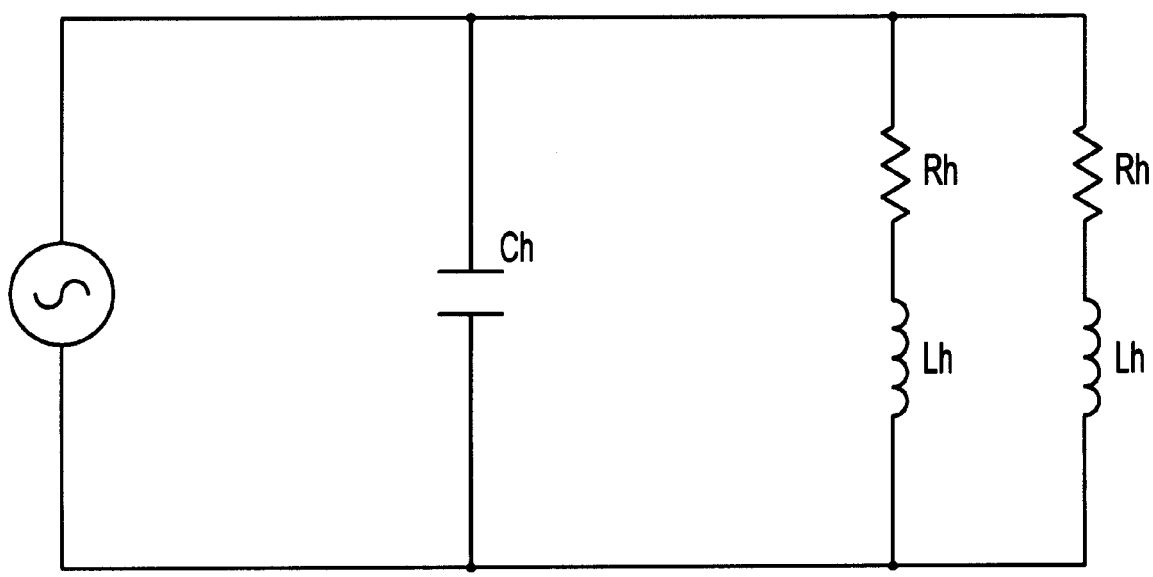
FIG. 7 is a schematic diagram of an electrical circuit defined by the write element of the present invention.
Figure 8:
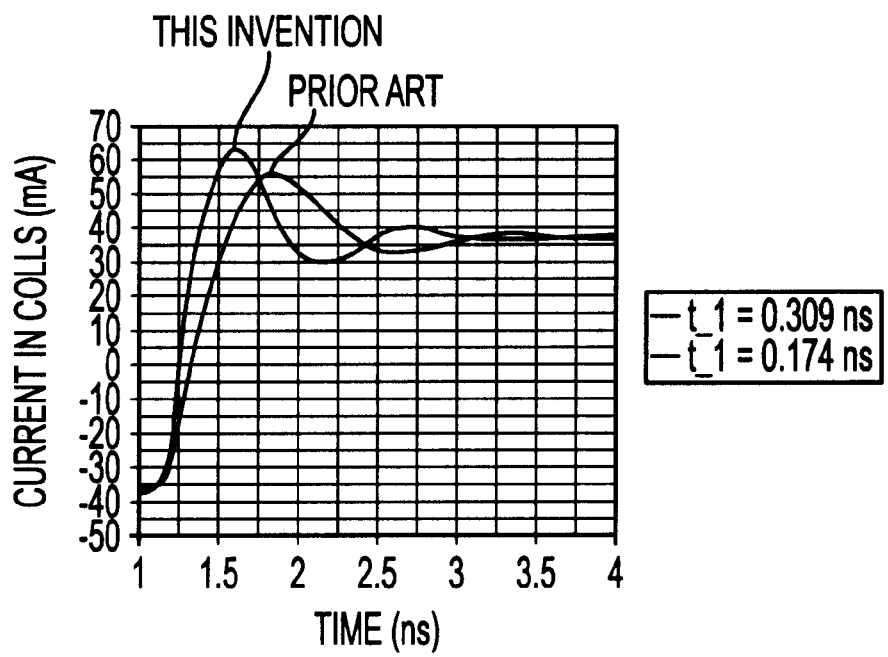
FIG. 8A is a graph illustrating the current rise time of a head of the present invention as compared with that of a prior art head.
FIG. 8B is a graph illustrating the data rate of a head of the present invention as compared with that of a prior art head.
Figure 8:
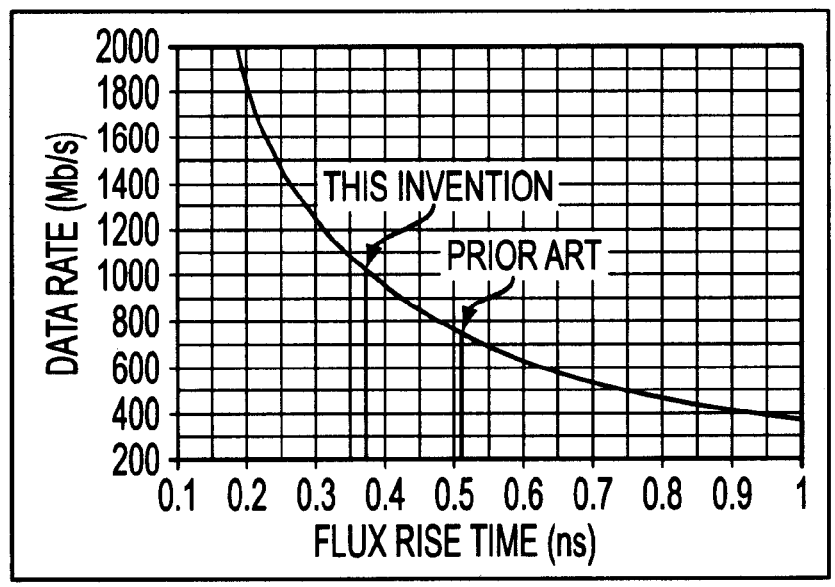
Figure 8:
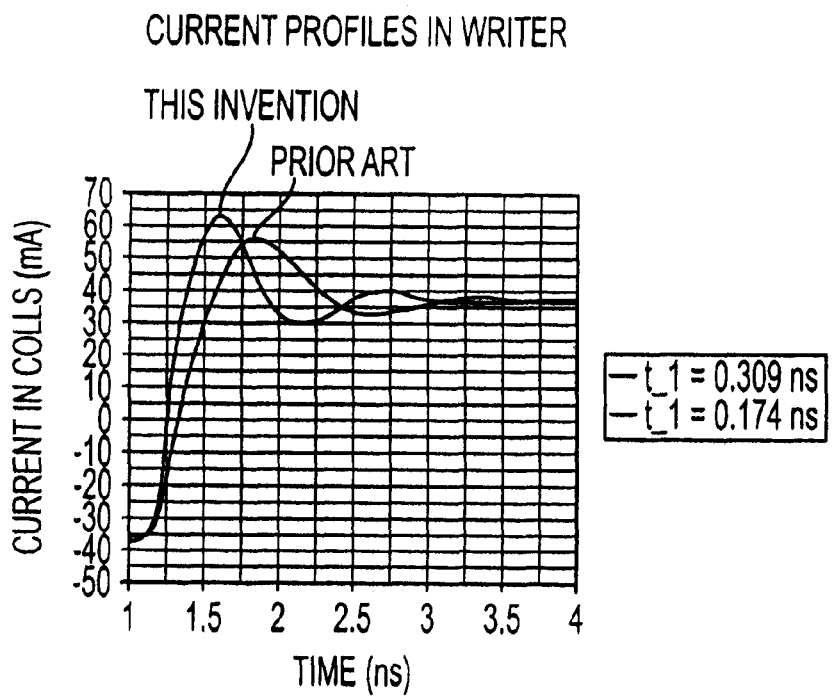
Figure 8:
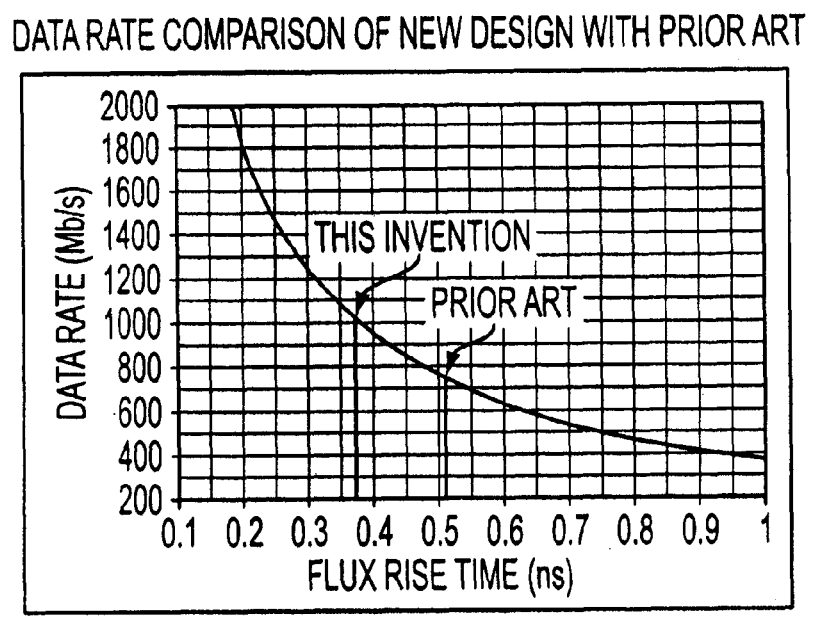

With reference to FIG. 7, the split coil 520 of the present invention provides a pair of parallel electrical paths through which to pass a current. The coil layers 536 and 538 can be modeled electrically as two branches of resistance and inductance: Rh1+Lh1 and Rh2+Lh2. Both circuit segments are in parallel with one another and are also in parallel with a head capacitance Ch. This is to be distinguished from prior art write heads, illustrated with reference to FIG. 3, in which the coil is modeled as a head resistance in series with a head inductance both of which are in parallel with a head capacitance. With reference to FIGS. 8A and 8B, it can be seen that the parallel electrical circuit provided by the split coil structure provides a larger overshoot and a shorter current rise time. Analysis here has shown a 44% improvement in current rise time.

Figure 9:
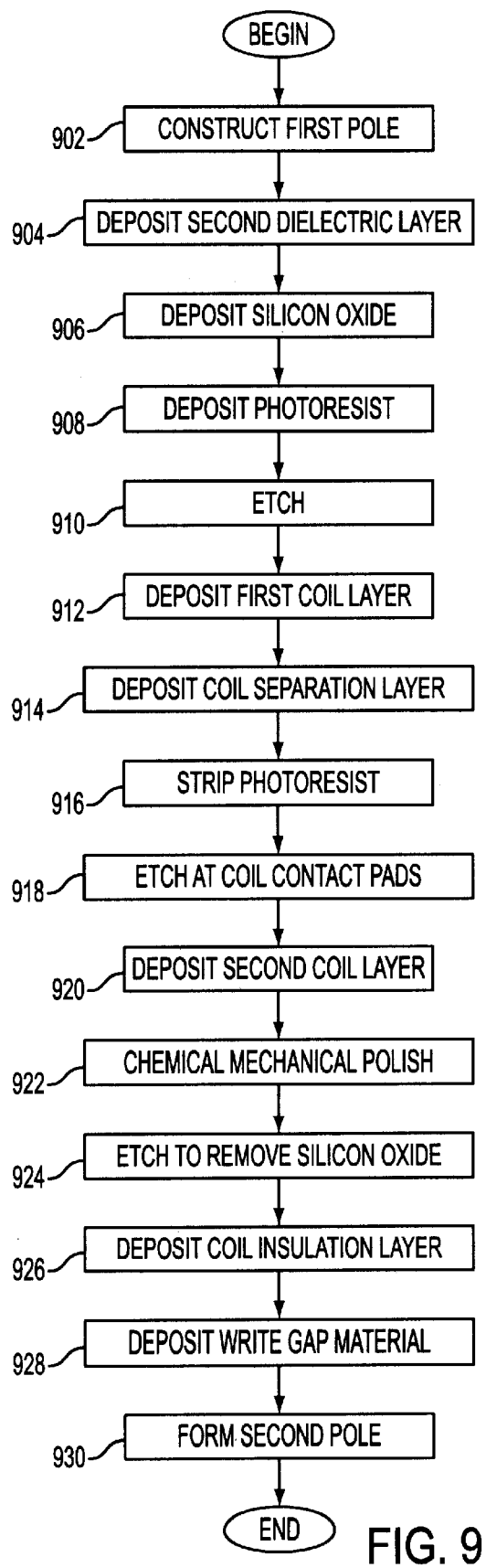
FIG. 9 is a process diagram of a method of manufacturing a write element of the present invention.
Figure 10:
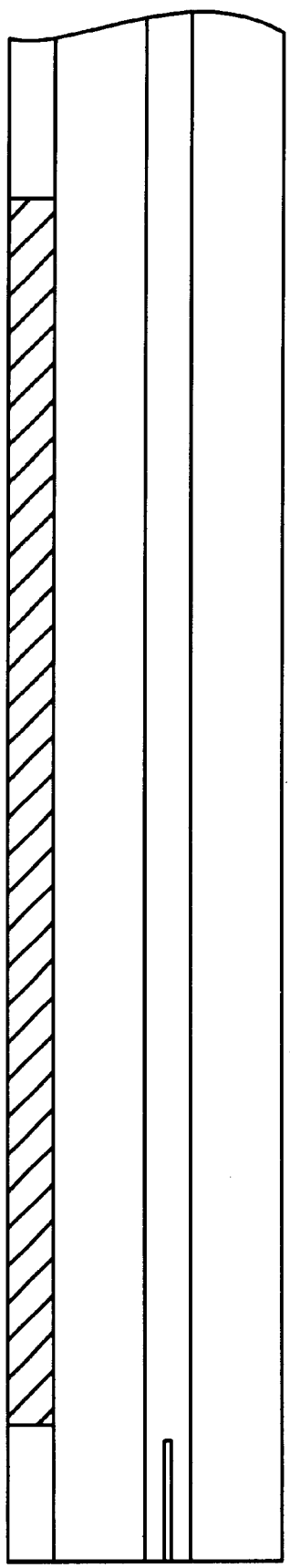
FIGS. 10–15 are cross sectional views of a read/write head of the present invention in progressive intermediate stages of development.

With reference to FIG. 9, a process 900 for constructing the head 500 of present invention will be described. With the read element already having been constructed, the process 900 begins with a step 902 of constructing the first pole 522 which includes building the write gap and back gap pedestals 526 and 530 on top of the second shield 510. The pedestals are constructed of $Ni_{55}Fe_{45}$ and are deposited by masking and plating. Then in a step 904, the second dielectric layer 534 is deposited onto the first pole. The dielectric layer 534 is formed by first depositing the $Al_2O_3$ so that it covers the entire first pole 522 including the pedestals 526 and 530. The $Al_2O_3$ is then polished by a chemical mechanical polishing process (CMP) until the upper surfaces 528 and 532 of the pedestals 526 and 530 are exposed and planarized. As can be more clearly seen with reference to FIG. 10, this results in a smooth flat surface across the tops of the dielectric layer and the pedestals. On top of this smooth flat surface, a copper seed layer is deposited. The copper seed layer provides an electrically conducting substrate on which to plate the coil in a subsequent plating process.

Figure 11:
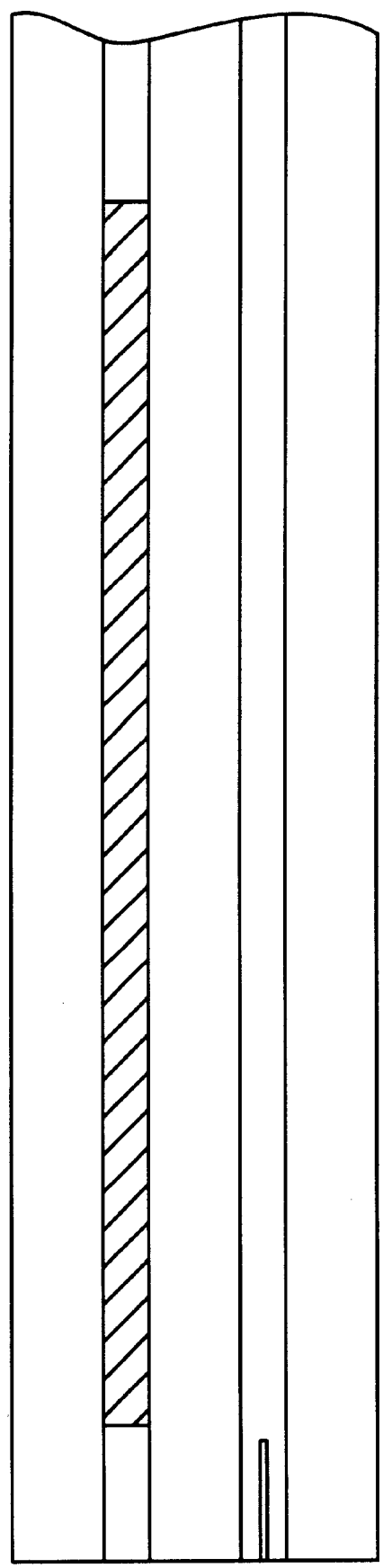
Figure 12:
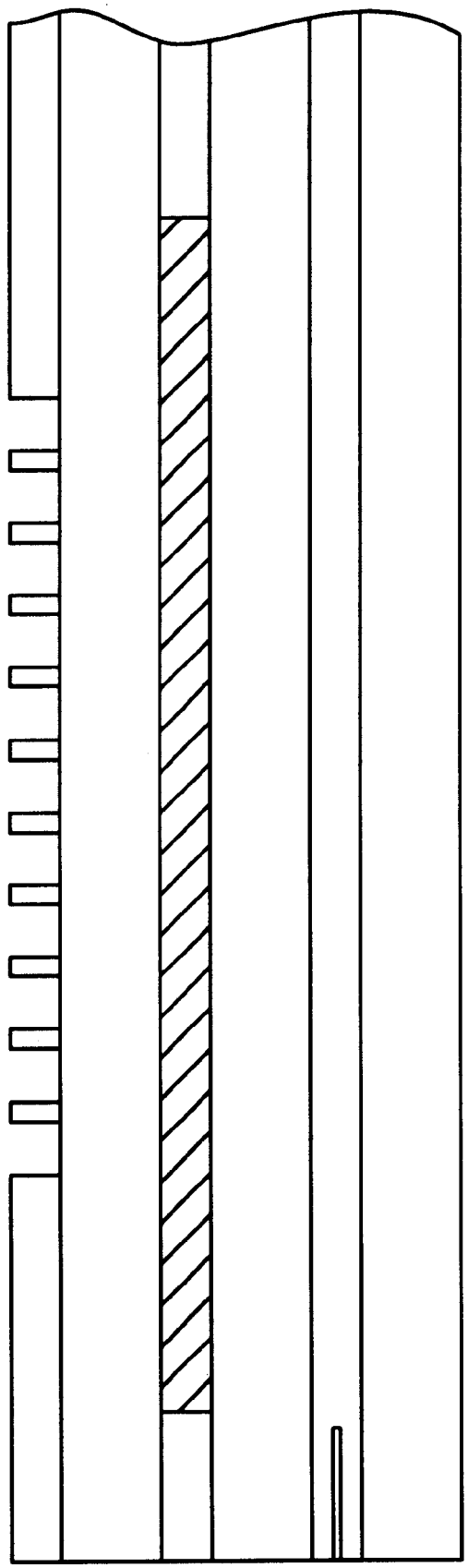
Figure 13:
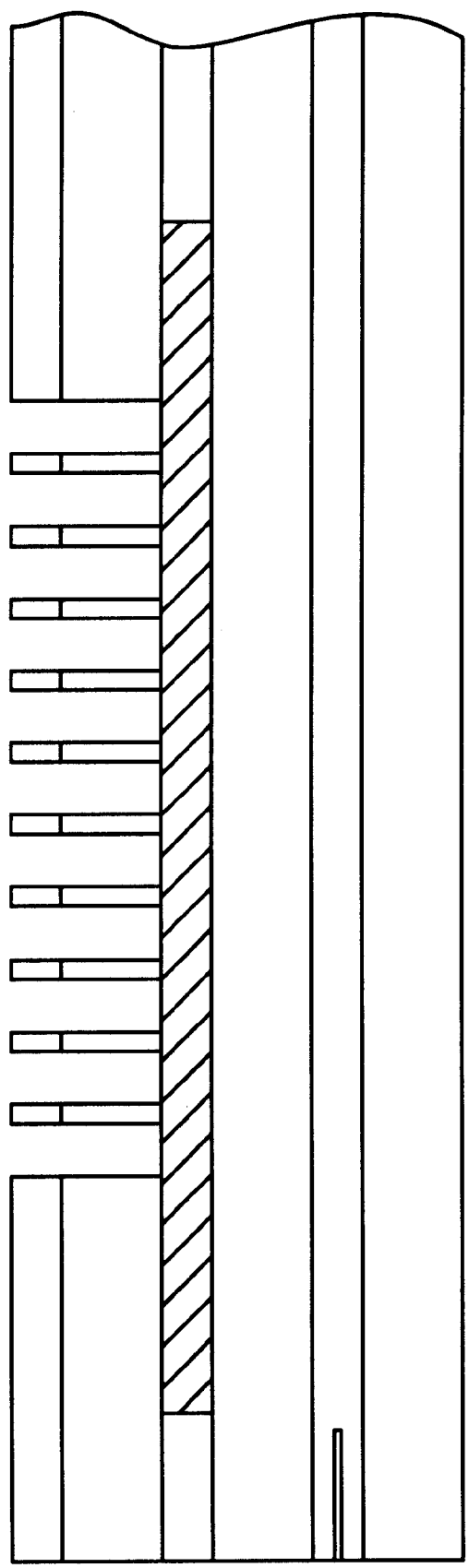
Figure 14:
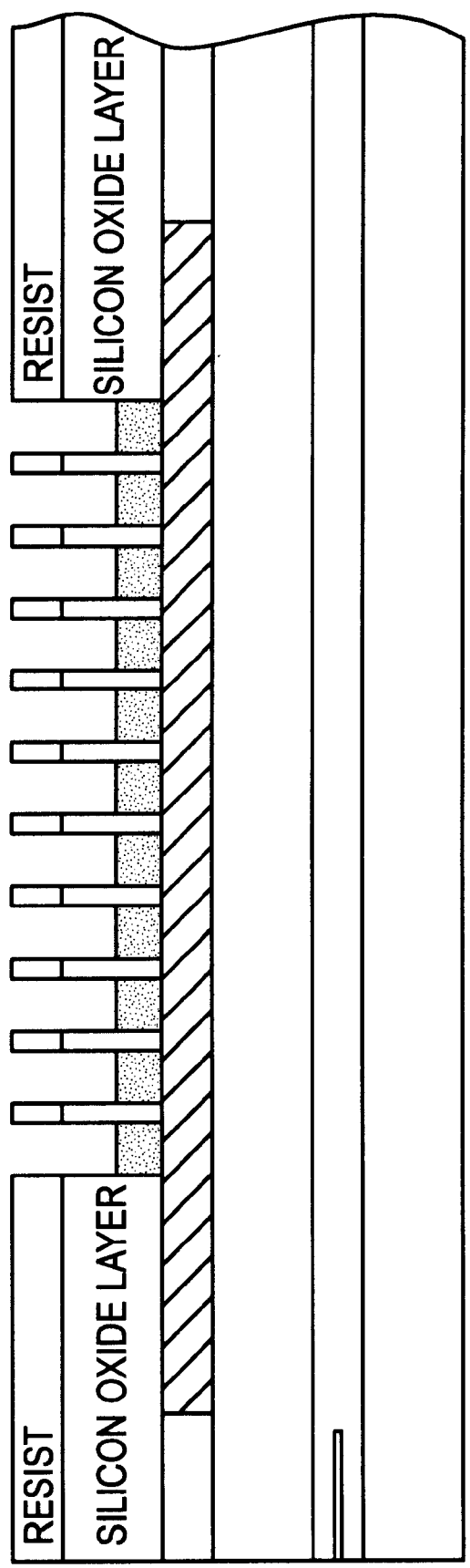
Figure 15:
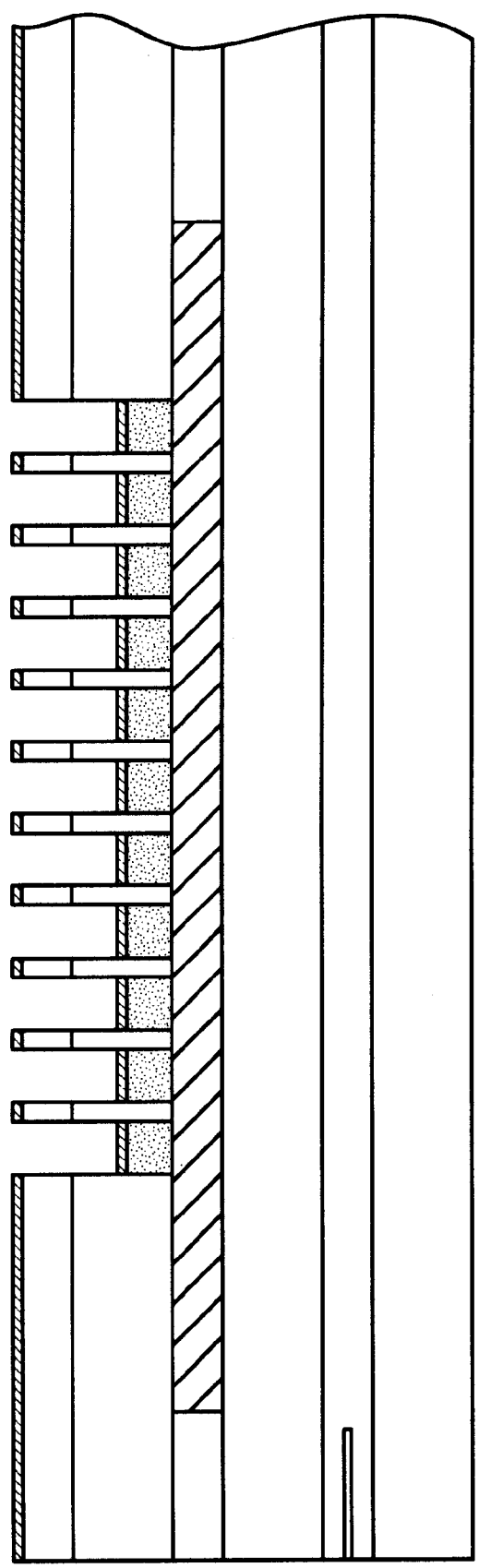
Figure 16:
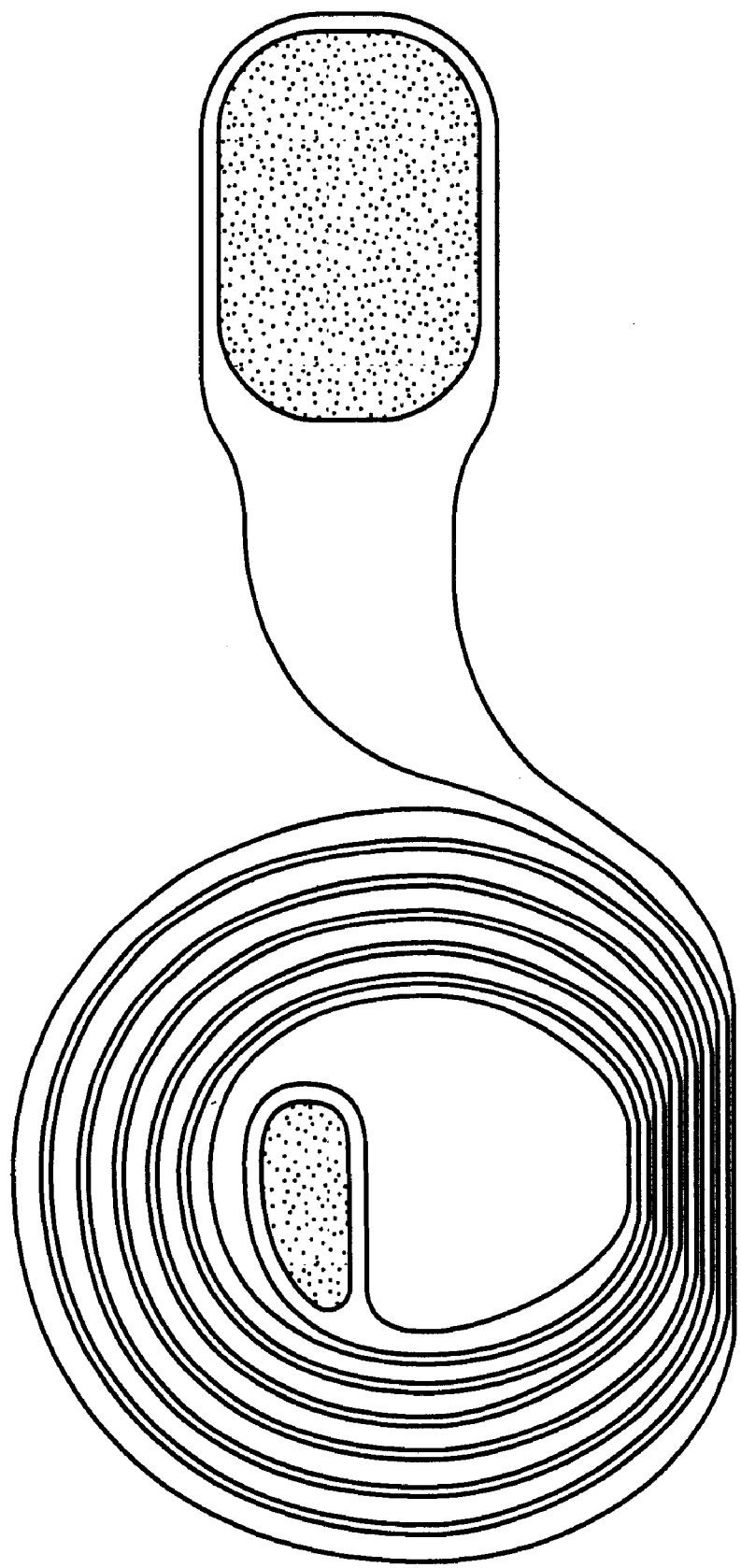
FIG. 16 is a plan view of a coil of the present invention showing locations for localized etching.

The process continues with a step 906 of depositing a layer of Silicon Oxide 1102, as can be seen with reference to FIG. 11. Then, in a step 908, a layer of photoresist is deposited and masked on top of the Silicon Oxide layer to reveal the desired coil pattern. This structure can be more clearly understood with reference to FIG. 12. In a step 910, an etching process is performed which removes the Silicon Oxide 1102 according to the coil pattern revealed by the masked photoresist as is shown with reference to FIG. 13. Subsequently, in a step 912, the first copper coil layer 536 is deposited. This can be seen with reference to FIG. 14. Then, in a step 914, a thin layer of $Al_2O_3$ 1502 is deposited to provide the coil separation layer 540, as can be seen with reference to FIG. 15. In a step 916 the photoresist layer is stripped which leaves the $Al_2O_3$ only in the area of the coil pattern. With reference to also FIG. 16, in a step 918, the coil separation layer 540 is etched at the locations of the contact pads 542 and 544.

Figure 17:
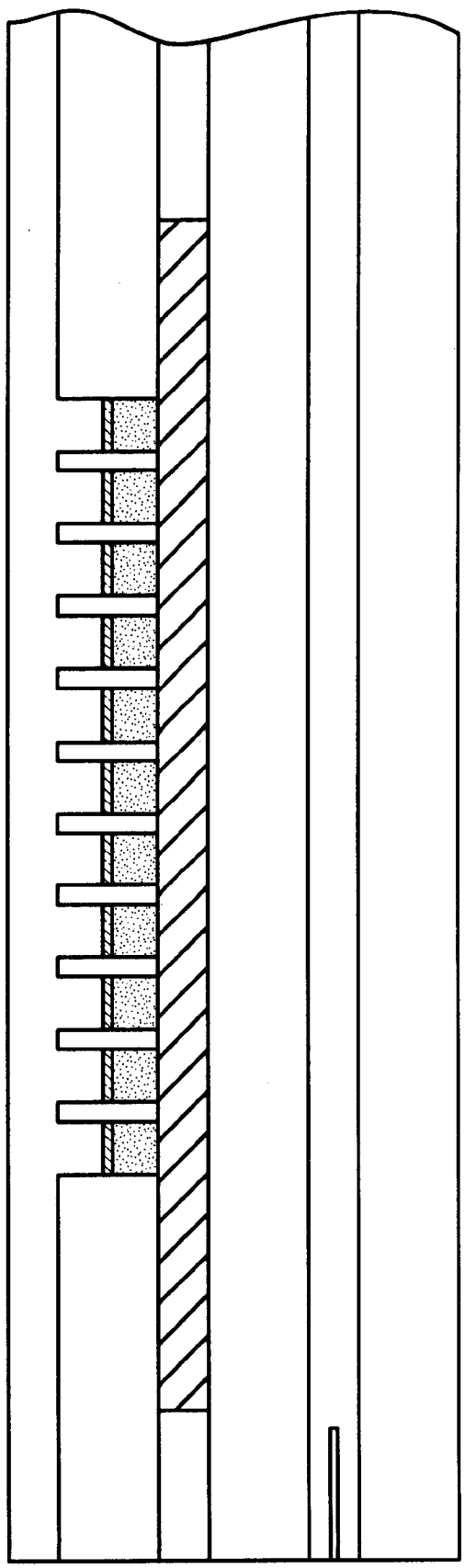
FIG. 17–19 are cross sectional views of a read/write head of the present invention in progressive intermediate stages of development.
Figure 18:
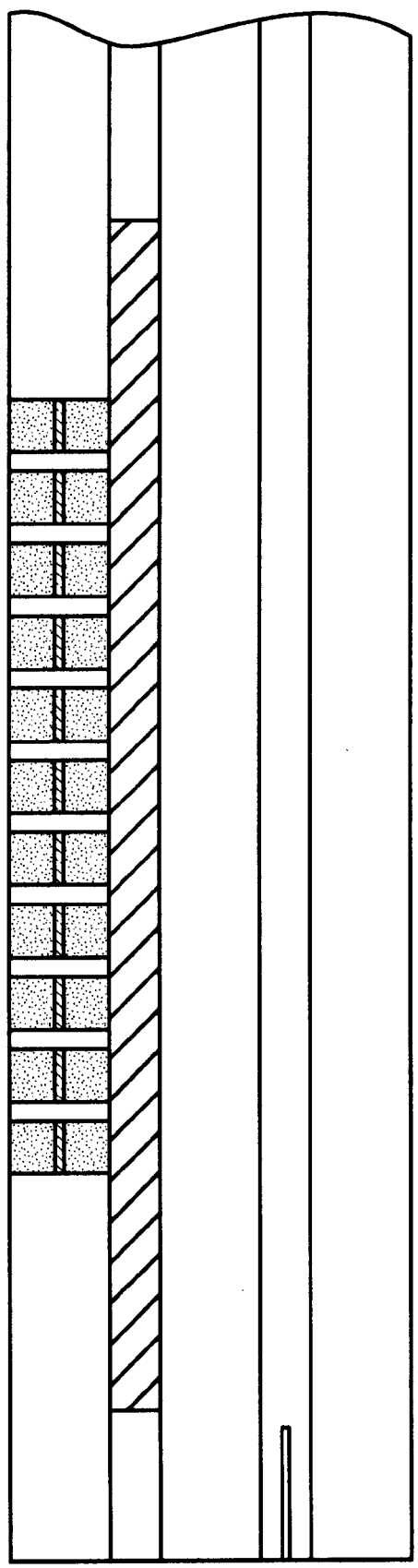
Figure 19:
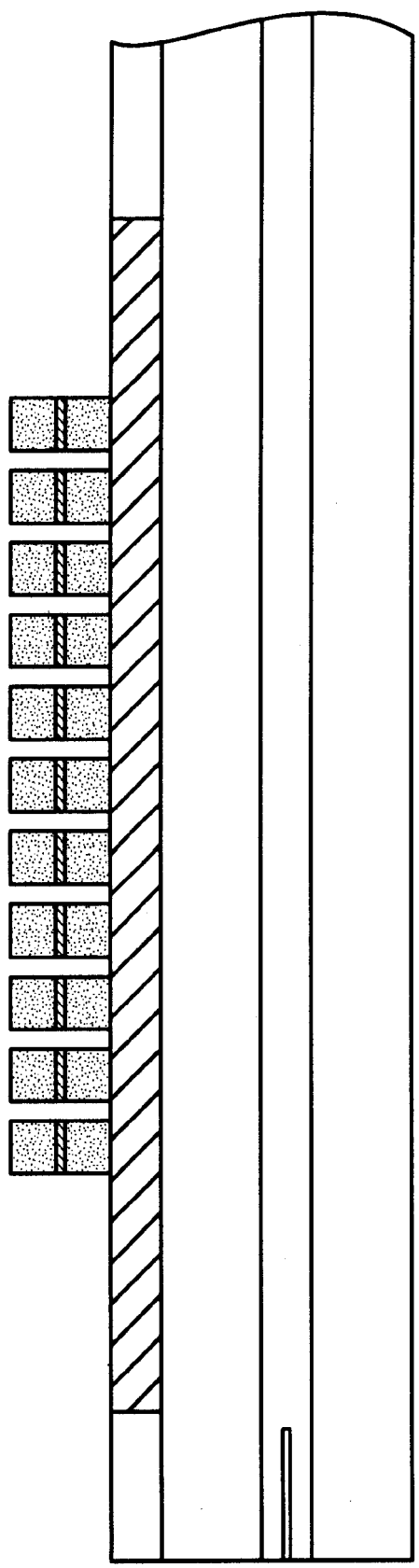

In a step 920, another layer of copper 1702 is deposited as shown with reference to FIG. 17. The step 920 includes depositing a second seed layer and plating the full film copper layer so that it covers the Silicon Oxide layer 1102 as well as the $Al_2O_3$ in the coil pattern area. With reference also to FIG. 18, in a step 922, a CMP process is conducted sufficiently to generate individual coil winds having flat upper surfaces. Thereafter, in a step 924, the Silicon Oxide layer 1102 is removed by an etching process, as can be understood more clearly with reference to FIG. 19.

With reference to FIG. 5, the split coil having been formed, the process 900 continues with a step 926 of depositing the coil insulation layer 546 over the coil. The coil insulation layer 546 is a photoresist which is spun onto the coil. The photoresist is masked to reveal the back gap pedestal 530 and the coil contact pads 542 and 544. The photoresist is then cured, causing it to form gradually sloped edges. In a step 928, a thin layer of non-magnetic, electrically insulating write gap material is deposited over the coil insulation layer and the write gap pedestal 526. The write gap material is preferably $Al_2O_3$. Over the write gap material, the second pole 524 is formed in a step 930. The second pole 524 is preferably constructed of $Ni_{45}Fe_{55}$ and is deposited by plating so that it contacts the back gap pedestal 530. In this way the first and second poles 522 and 524 together form the yoke 518.

In an alternate embodiment of the invention, not shown, the write gap material layer is formed prior to forming the coil so that the write gap material layer sits between the coil and the second dielectric layer. This embodiment functions in essentially the same way as the preferred embodiment, using a split coil to increase current rise time.

In another embodiment of the invention, also not shown, the first pole is formed without one or both of the write gap and back gap pedestals. This embodiment can either include a dielectric layer to separate the coil from the first pole, or alternatively can use the write gap material to provide such separation.

In summary, the present invention provides a write element which employs a fundamentally unique coil design to provide a significant decrease in current rise time. This provides a corresponding increase in data rate capability. While the invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. Therefore, the embodiments and preferred features described above should be considered exemplary, with the invention being defined by the appended claims which include all such alternatives, modifications, permutations and equivalents as fall within the true spirit and scope of the invention.

What is claimed is:

1. A thin film magnetic write head with a parallel path coil structure, the thin film head comprising:
    a magnetic yoke including
        a closed end and an open end, and
        first and second poles extending from the closed end to the open end and defining a yoke interior therebetween; and
    an electrically conductive coil that
        is electrically insulated from the yoke,
        has a portion extending through the yoke interior,
        terminates in inner and outer common coil contact pads, and
        includes a portion split into similar concentric first and second coil portions that
            are joined at the inner and outer common coil contact pads,
            each define a parallel electrical circuit, and
            are configured such that
                the first coil portion is disposed directly over the second coil portion, and
                the first and second coil portions are separated by an electrically insulating material.

2. The thin film magnetic write head as recited in claim 1 wherein said electrically insulating material is $Al_2O_3$.

3. The thin film magnetic write head as recited in claim 1 wherein said coil has a pitch of less than 2 microns.

4. A thin film magnetic write head for high density data recording, comprising:
    a magnetic yoke having an open end and a closed end opposite the open end and defining an open interior between the open and closed ends;
    two or more electrically conductive coils in parallel electrical circuits, a portion of each coil passing through the interior of the yoke, the electrically conductive coils being arranged such that successive electrically conductive coils are disposed directly above a lower electrically conductive coil;
    an inner coil contact pad forming an inner end of each electrically conductive coil and an outer coil contact pad forming an outer end of each electrically conductive coil;
    a coil separation layer disposed directly between successive electrically conductive coils and that extends from the inner coil contact pad to the outer coil contact pad; and
    an electrical insulator disposed at least partially within said yoke interior and electrically isolating said coils from said yoke.

5. The thin film magnetic write head as recited in claim 4 wherein there are two of said coils.

6. The thin film magnetic write head as recited in claim 4 wherein there are three of said coils.

7. A thin film magnetic write head having a parallel path coil structure comprising:
    a magnetic yoke having a closed end and an open end and having first and second poles extending from said closed end to said open end, said yoke defining an interior between said first and second poles;
    a write gap pedestal disposed between said first and second poles at said open end and including upper and lower surfaces defining upper and lower planes;
    an electrically conductive coil, having a portion thereof extending through said yoke interior, said coil being electrically insulated from said yoke, said coil terminating in inner and outer contacts, at least a portion of said coil being split one or more times to define two or more parallel electrical circuits respectively; and
    a dielectric layer disposed between said first pole and said electrically conductive coil and including upper and lower surfaces that are coplanar with said upper and lower planes.

8. The thin film magnetic write head of claim 7 wherein said parallel electrical circuits are insulated from one another by a coil separation layer.

9. The thin film magnetic write head of claim 8 wherein said coil separation layer includes a dielectric insulating material.

10. The thin film magnetic write head of claim 8 wherein said coil separation layer includes $Al_2O_3$.

11. The thin film magnetic write head of claim 7 further comprising a coil insulation layer disposed between said electrically conductive coil and said second pole.

12. The thin film magnetic write head of claim 11 wherein said coil insulation layer includes cured photoresist.

13. The thin film magnetic write head of claim 11 wherein said coil insulation layer includes a smoothly sloping edge adjacent said write gap pedestal.

14. The thin film magnetic write head of claim 7 further comprising a write gap material layer disposed between said write gap pedestal and said second pole.

15. The thin film magnetic write head of claim 14 wherein said write gap material layer includes an electrically insulating and non-magnetic material.

16. The thin film magnetic write head of claim 14 wherein said write gap material layer includes $Al_2O_3$.

17. The thin film magnetic write head of claim 14 further comprising a coil insulation layer disposed between said electrically conductive coil and said second pole.

18. The thin film magnetic write head of claim 17 wherein said write gap material layer is further disposed between said coil insulation layer and said second pole.

19. The thin film magnetic write head of claim 17 wherein said write gap material layer is further disposed between said coil insulation layer and said electrically conductive coil.

20. The thin film magnetic write head of claim 14 wherein said write gap material layer is further disposed between said electrically conductive coil and said first pole.

21. The thin film magnetic write head of claim 7 wherein said electrically conductive coil has a pitch of less than 2 microns.

22. A method for fabricating a thin film magnetic write head comprising:

forming a first magnetic pole;

forming a first dielectric layer over the magnetic pole;

forming a first coil layer including an inner and an outer end and defining a first electrically conductive circuit over the first dielectric layer;

forming a coil separation layer over all of the first coil layer except for over portions of the first coil layer at the inner end and at the outer end;

forming a second coil layer including an inner and an outer end and defining a second electrically conductive circuit over the coil separation layer, the inner and the outer ends of the second coil layer being in electrical contact with the inner and the outer ends of the first coil layer, respectively;

forming a second dielectric layer over the second coil layer; and forming a second magnetic pole over the second dielectric layer.

23. The method for fabricating a thin film magnetic write head of claim 22 wherein the second coil layer is aligned with the first coil layer.

24. The method for fabricating a thin film magnetic write head of claim 22 wherein forming the first coil layer includes forming a first portion of an inner contact pad at the inner end and a first portion of an outer contact pad at the outer end; and forming the second coil layer includes forming a second portion of an inner contact pad at the inner end and a second portion of an outer contact pad at the outer end.

25. The method for fabricating a thin film magnetic write head of claim 24 wherein the second portion of the outer contact pad is aligned with the first portion of the outer contact.

26. The method for fabricating a thin film magnetic write head of claim 22 further comprising forming a write gap pedestal above the first pole.

27. The method for fabricating a thin film magnetic write head of claim 26 further comprising planarizing the write gap pedestal and the first dielectric layer.

28. The method for fabricating a thin film magnetic write head of claim 22 further comprising forming a write gap layer above the first pole and above the second coil layer.

* * * * *